US010636293B2

(12) United States Patent
Dong et al.

(10) Patent No.: US 10,636,293 B2
(45) Date of Patent: Apr. 28, 2020

(54) UNCERTAINTY MODELING IN TRAFFIC DEMAND PREDICTION

(71) Applicant: International Business Machines Corporation, Armonk, NY (US)

(72) Inventors: Wei Shan Dong, Beijing (CN); Peng Gao, Beijing (CN); Wei Sun, Beijing (CN); Jun Chi Yan, Shanghai (CN); Shi Lei Zhang, Beijing (CN); Xin Zhang, Beijing (CN); Jun Zhu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 146 days.

(21) Appl. No.: 15/616,089

(22) Filed: Jun. 7, 2017

(65) Prior Publication Data
US 2018/0357892 A1    Dec. 13, 2018

(51) Int. Cl.
*G08G 1/01* (2006.01)
*G06Q 30/02* (2012.01)

(52) U.S. Cl.
CPC ....... *G08G 1/0129* (2013.01); *G06Q 30/0205* (2013.01)

(58) Field of Classification Search
None
See application file for complete search history.

(56) References Cited

U.S. PATENT DOCUMENTS 9,349,150 B2    5/2016  Chidlovskii
9,613,529 B2 *  4/2017  Downs ................. G08G 1/0129

| 2004/0138936 | A1  | 7/2004 | Johnson et al. |
| 2014/0114927 | A1* | 4/2014 | Anderson ............... G06F 17/30 707/687 |
| 2015/0186792 | A1  | 7/2015 | Chidlovskii |
| 2016/0066155 | A1* | 3/2016 | Fan ........................ G06F 3/0484 455/457 |

(Continued)

OTHER PUBLICATIONS

Dong et al., "Uncertainty Modeling in Traffic Demand Prediction", USPTO U.S. Appl. No. 15/889,342, filed Feb. 6, 2018, 36 pages.

(Continued)

*Primary Examiner* — Jonathan M Dager
*Assistant Examiner* — Garrett F Evans
(74) *Attorney, Agent, or Firm* — Daniel R. Simek (57) ABSTRACT

The disclosure involves a method comprising clustering a plurality of observation samples related to historical travel demands into one or more clusters; for each cluster, constructing an actual probability distribution of the historical travel demands corresponding to the observation samples in the cluster; for each cluster, inputting observation samples in the cluster into a prediction model for predicting future travel demands to produce a result of prediction; for each cluster, computing a predicted probability distribution of the historical travel demands corresponding to the observation samples in the cluster based on the result of prediction; for each cluster, evaluating a difference between the actual probability distribution and the predicted probability distribution of the cluster; and modifying the prediction model so that a statistical sum of the differences for the one or more clusters is decreased.

17 Claims, 6 Drawing Sheets

(56) References Cited

U.S. PATENT DOCUMENTS

| | | | |
|---|---|---|---|
| 2016/0300150 A1 | 10/2016 | Watts-Fitzgerald et al. | |
| 2017/0076227 A1* | 3/2017 | Elgie | B60W 40/08 |
| 2017/0076595 A1* | 3/2017 | Macfarlane | G08G 1/0129 |
| 2017/0309171 A1* | 10/2017 | Zhao | G01S 19/13 |
| 2017/0343702 A1* | 11/2017 | Radich | G01W 1/10 |

OTHER PUBLICATIONS

IBM Appendix P, list of patents and patent applications treated as related, filed herewith, 2 pages.

Cheung et al., "A Bayesian Approach to Modelling Uncertainty in Transport Infrastructure Project Forecasts", © AET 2009 and contributors, 22 pages.

Niles et al., "Identifying Uncertainties in Forecasts of Travel Demand", © 2001, John S. Niles and Dick Nelson, 22 pages.

Omrani, Hichem, "Predicting travel mode of individuals by machine learning", 18th Euro Working Group on Transportation, EWGT 2015, Jul. 14-16, 2015, Delft, The Netherlands, Transportation Research Procedia 10 ( 2015 ) 840-849, Published by Elsevier B. V., pp. 840-849.

Zhao et al., "The Propagation of Uncertainty Through Travel Demand Models", Research Report SWUTC/00/167804-1, Oct. 2000, 47 pages.

* cited by examiner

UNCERTAINTY MODELING IN TRAFFIC DEMAND PREDICTION

BACKGROUND

The present invention relates to traffic demand prediction, and more specifically, to uncertainty modeling in traffic demand prediction.

Traffic demand prediction helps to predict future travel demands of offering/taking a ride in a certain time period within a specific district, which enables ride-hailing service providers to maximize utilization of drivers willing to offer a ride and optimally satisfy passengers' needs of taking a vehicle.

Traditional travel demand prediction methods provided for predicting future travel demands mainly include four steps of trip generation, trip distribution, mode choice and trip assignment. These methods may be applied to travel demand prediction with coarser granularity and may provide future travel demands with low accuracy.

In recent years, new travel demand prediction methods are under study. For example, data-driven methods based on factorization machine or multi-output support vector regression machine may be used for travel demand prediction. With use of these methods, a deterministic prediction result of future travel demands would be acquired.

SUMMARY

According to one embodiment of the present invention, there is provided a method. The method may comprise clustering a plurality of observation samples related to historical travel demands into one or more clusters. The method may further comprise for each cluster, constructing an actual probability distribution of the historical travel demands corresponding to the observation samples in the cluster. The method may further comprise for each cluster, inputting observation samples in the cluster into a prediction model for predicting future travel demands to produce a result of prediction. The method may further comprise for each cluster, computing a predicted probability distribution of the historical travel demands corresponding to the observation samples in the cluster based on the result of prediction. The method may further comprise for each cluster, evaluating a difference between the actual probability distribution and the predicted probability distribution of the cluster. The method may further comprise modifying the prediction model so that a statistical sum of the differences for the one or more clusters is decreased.

According to another embodiment of the present invention, there is provided a system, which may comprise one or more processors and a memory coupled to at least one of the one or more processors. The system may further comprise a set of computer program instructions stored in the memory and executed by at least one of the one or more processors in order to perform an action of clustering a plurality of observation samples related to historical travel demands into one or more clusters. The system may further comprise a set of computer program instructions stored in the memory and executed by at least one of the one or more processors in order to perform an action of for each cluster, constructing an actual probability distribution of the historical travel demands corresponding to the observation samples in the cluster. The system may further comprise a set of computer program instructions stored in the memory and executed by at least one of the one or more processors in order to perform an action of for each cluster, inputting observation samples in the cluster into a prediction model for predicting future travel demands to produce a result of prediction. The system may further comprise a set of computer program instructions stored in the memory and executed by at least one of the one or more processors in order to perform an action of for each cluster, computing a predicted probability distribution of the historical travel demands corresponding to the observation samples in the cluster based on the result of prediction. The system may further comprise a set of computer program instructions stored in the memory and executed by at least one of the one or more processors in order to perform an action of for each cluster, evaluating a difference between the actual probability distribution and the predicted probability distribution of the cluster. The system may further comprise a set of computer program instructions stored in the memory and executed by at least one of the one or more processors in order to perform an action of modifying the prediction model so that a statistical sum of the differences for the one or more clusters is decreased.

According to a further embodiment of the present invention, there is provided a computer program product. The computer program product may comprise a computer readable storage medium having program instructions embodied therewith. The program instructions may be executable by a device to perform a method. The method may comprise clustering a plurality of observation samples related to historical travel demands into one or more clusters. The method may further comprise for each cluster, constructing an actual probability distribution of the historical travel demands corresponding to the observation samples in the cluster. The method may further comprise for each cluster, inputting observation samples in the cluster into a prediction model for predicting future travel demands to produce a result of prediction. The method may further comprise for each cluster, computing a predicted probability distribution of the historical travel demands corresponding to the observation samples in the cluster based on the result of prediction. The method may further comprise for each cluster, evaluating a difference between the actual probability distribution and the predicted probability distribution of the cluster. The method may further comprise modifying the prediction model so that a statistical sum of the differences for the one or more clusters is decreased.

DETAILED DESCRIPTION

The descriptions of the various instances, scenarios, and examples related to the present invention are presented for purposes of illustration and are not intended to be exhaustive. The present disclosure can be implemented in various manners and should not be construed to be limited to the embodiments disclosed herein. The present invention will now be described in detail with reference to the Figures.

Figure 1:
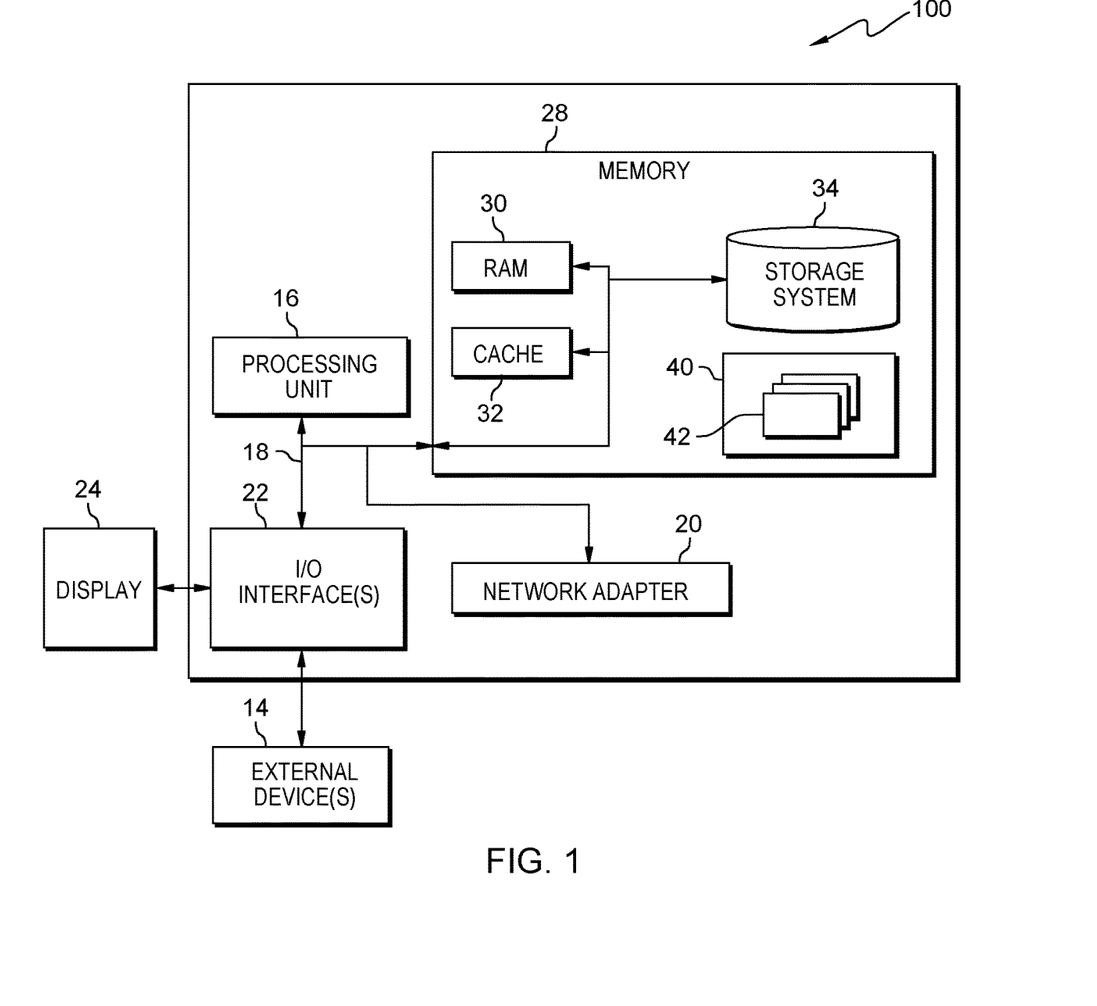
FIG. 1 shows an exemplary computer system which is applicable to implement the embodiments of the present invention.

FIG. 1 shows computer system 100, an exemplary computer system that is applicable to implement the embodiments of the present invention. Computer system 100 is only illustrative and is not intended to suggest any limitation as to the scope of use or functionality of embodiments of the invention described herein. FIG. 1 is also adapted to depict an illustrative example of a portable electronic device, such as a communication device, that is applicable to implement the embodiments of the present invention.

Computer system 100 is shown in the form of a general-purpose computing device. The components of computer system 100 may include, but are not limited to, processing units 16, which may represent one or more processors or processing units, system memory 28, and bus 18.

Bus 18 couples various components of computer system 100, including system memory 28 and processor 16. Bus 18 represents one or more of any of several types of bus structures, including a memory bus or memory controller, a peripheral bus, an accelerated graphics port, and a processor or local bus using any of a variety of bus architectures. Such bus architectures include, for example, Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 100 includes computer readable media. Such media may be any available media that is accessible by computer system 100. Computer readable media can include volatile and non-volatile media, as well as removable and non-removable media.

System memory 28 can include computer system readable media in the form of volatile memory, such as random access memory (RAM) 30 and/or cache memory 32. Computer system 100 may further include other removable/non-removable, volatile/non-volatile computer system storage media. By way of example only, storage system 34 can be provided for reading from and writing to a non-removable, non-volatile magnetic media (e.g., a "hard drive") (not shown). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

In some embodiments, program 40, which includes program modules 42, is stored in memory 28. Program 40 may also be stored in an operating system, one or more application programs, other program modules, and/or program data. Each of the operating system, one or more application programs, other program modules, and program data, or some combination thereof, may include an implementation of a networking environment. Some embodiments of the present invention discussed with reference to FIGS. 2-6 may be implemented as program 40 and/or program modules 42. Program 40 and/or program modules 42 generally carry out the functions or methodologies of embodiments of the invention as described herein.

In some embodiments, computer system 100 communicates with display 24 and external device(s) 14. External device(s) 14 may include, for example, one or more of a keyboard, a pointing device, one or more devices that enable a user to interact with computer system 100, and/or any devices (e.g., a network card, a modem) that enable computer system 100 to communicate with one or more other computing devices. Such communication can occur via Input/Output (I/O) interface(s) 22. Still yet, computer system 100 can communicate with one or more networks such as a local area network (LAN), a general wide area network (WAN), and/or a public network (e.g., the Internet) via network adapter 20. As depicted, network adapter 20 communicates with the other components of computer system 100 via bus 18. It should be understood that although not shown, other hardware and/or software components could be used in conjunction with computer system 100. Examples, include, but are not limited to, microcode, device drivers, redundant processing units, external disk drive arrays, RAID systems, tape drives, and data archival storage systems.

Embodiments of the present invention will now be described with reference to FIGS. 2-6.

Embodiments of the present invention recognize that existing travel demand prediction methods may only provide a deterministic prediction result of future travel demands when historical travel demands are known. For example, in order to predict a future travel demand N during this afternoon, the observed historical travel demands during the afternoon for the past three days, i.e., $N_1=500$, $N_2=400$, $N_3=600$ may be used. The prediction result of the future travel demand N during this afternoon would be predicted as N=500, which is an average of $N_1$, $N_2$ and $N_3$ and is a deterministic value without uncertainty. Travel demand described herein indicates one of a number of passengers who need a ride in a vehicle.

Embodiments of the present invention recognize that travel plans change with various factors such as traffic condition, weather, and temperature. Therefore, the future travel demand may not be a deterministic value, but a stochastic variable with uncertainty related to factors affecting the future travel demand. Embodiments of the present invention recognize that existing travel demand prediction methods do not consider the uncertainty in travel demand prediction and thus cannot efficiently predict the stochastic variable future travel demand, even if all historical travel demands are known. Therefore, there exists a need for modeling uncertainty in travel demand prediction in order to predict future travel demands more accurately and efficiently.

Figure 2A:
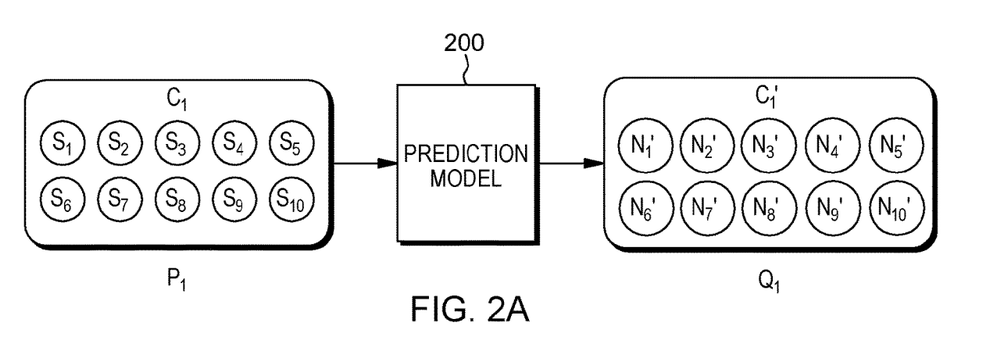
FIGS. 2A and 2B show an example of uncertainty modeling in traffic demand prediction according to an embodiment of the present invention.
Figure 2B:
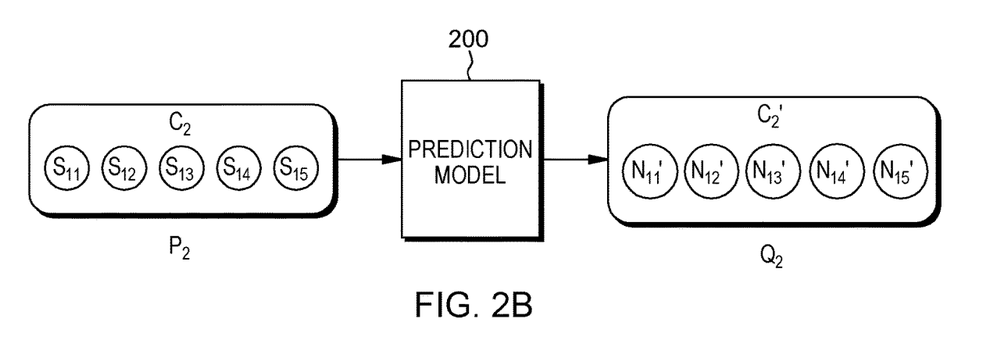

FIGS. 2A and 2B show an example of uncertainty modeling in traffic demand prediction according to an embodiment of the present invention.

In some embodiments, observation samples $\{s_1, s_2, \ldots, s_{15}\}$ are collected to model uncertainty in travel demand prediction. Each observation sample $s_i$ may relate to a historical travel demand $N_i$ in $\{N_1, N_2, \ldots, N_{15}\}$ (not shown) (i is a natural number and $1 \leq i \leq 15$).

In some embodiments, the observation samples $\{s_1, s_2, \ldots, s_{15}\}$ are inputted to prediction model 200, and prediction model 200 may be used to provide a result of prediction $\{N_1', N_2', \ldots, N_{15}'\}$ based on the inputted observation samples, wherein $N_i'$ is a predicted future travel demand (based on the inputted observation sample $s_i$) (i is a natural number and $1 \leq i \leq 15$).

In some embodiments, prior to being inputted to prediction model 200, the observation samples $\{s_1, s_2, \ldots, s_{15}\}$ are clustered to construct actual probability distributions, and the result of prediction $\{N_1', N_2', \ldots, N_{15}'\}$ is used to predict probability distributions. The actual distributions and the predicted distributions may indicate uncertainty in historical travel demands and may be used to modify prediction model 200. By means of this prediction phase, prediction model 200 may be used to predict future travel demands in consideration of uncertainty.

As shown in FIGS. 2A and 2B, in some embodiments, prior to being inputted to prediction model 200, the observation samples $\{s_1, s_2, \ldots, s_{15}\}$ are clustered into clusters $C_1$ and $C_2$, wherein $s_1, s_2, \ldots, s_{10}$ are clustered into $C_1$, and $s_{11}, s_{12}, \ldots, s_{15}$ are clustered into $C_2$. The clusters, $C_1$ and $C_2$, may be inputted to the prediction model 200 sequentially. The results of prediction subsequently outputted from prediction model 200 are outputted as $C_1'$ and $C_2'$, corresponding to $C_1$ and $C_2$ respectively.

In some embodiments, for each cluster, $C_1$ and $C_2$, an actual probability distribution of the historical travel demands in the cluster is constructed. For example, actual probability distribution $P_1$ is constructed from historical travel demands $N_1, N_2, \ldots, N_{10}$ (not shown) in cluster $C_1$. Actual probability distribution $P_2$ is similarly constructed from cluster $C_2$.

In some embodiments, for each cluster, $C_1$ and $C_2$, a predicted probability distribution of the historical travel demands in the cluster is computed. For example, predicted probability distribution $Q_1$ is computed from $N_1', N_2', \ldots, N_{10}'$, the result of prediction based on cluster $C_1$. Similarly, predicted probability distribution $Q_2$ is computed from $N_{11}', N_{12}', \ldots, N_{15}'$, the result of prediction based on cluster $C_2$.

In some embodiments, for each cluster, $C_1$ and $C_2$, a difference between the actual probability distribution and the predicted probability distribution of the cluster is evaluated. For example, for cluster $C_1$, the difference may be evaluated by an expression $|P_1 - Q_1|$, wherein $|P_1 - Q_1|$ denotes the absolute value of the difference between $P_1$ and $Q_1$. Similarly, the difference for cluster $C_2$ may be evaluated by an expression $|P_2 - Q_2|$ which denotes the absolute value of the difference between $P_2$ and $Q_2$.

In some embodiments, prediction model 200 is modified such that a statistical sum of the differences for the clusters is decreased. For example, the prediction model 200 may be modified such that the value of the expression $|P_1 - Q_1| + |P_2 - Q_2|$ decreases. As another example, the value of the expression $|P_1 - Q_1|^2 + |P_2 - Q_2|^2$ decreases. In other embodiments, prediction model 200 is modified such that the statistical sum of the differences for the clusters is minimized.

Figure 3:
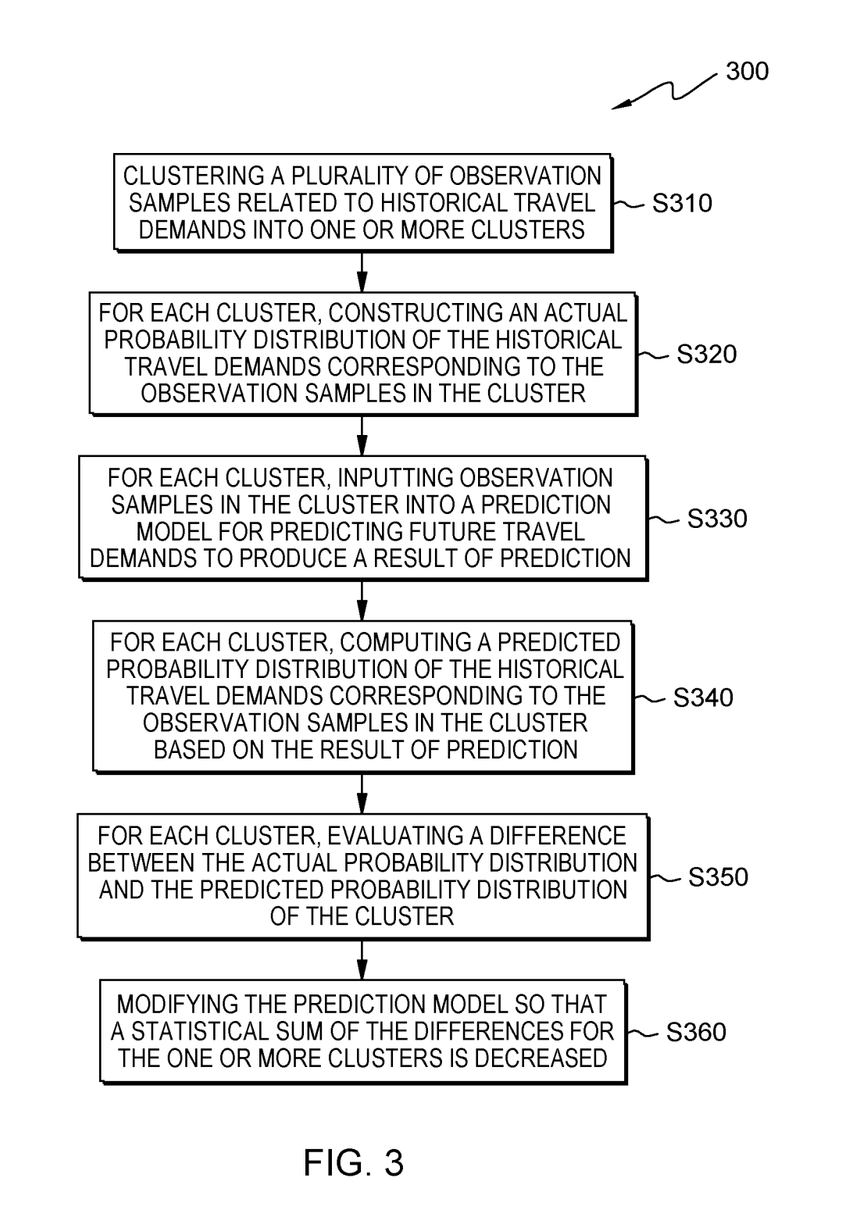
FIG. 3 is a flowchart showing an exemplary method according to an embodiment of the present invention.

FIG. 3 is a flowchart showing method 300, which is an exemplary method according to an embodiment of the present invention.

In step S310, the observation samples, $\{s_1, s_2, \ldots, s_{15}\}$, related to historical travel demands are clustered into one or more clusters, $C_1$ and $C_2$. In some embodiments, each observation sample includes an observation position and an observation time period for observation of a historical travel demand corresponding to the observation sample. In some embodiments, the observation position indicates a specific geographic district where the observation of the historical travel demand occurs, and the observation time period indicates a time period during which the observation occurs. In some embodiments, the observation position is a square with side lengths of 1 km.

In some embodiments, each observation sample includes one or more factors affecting the historical travel demand Examples of factors affecting the historical travel demand include travel origin, travel destination, traffic condition, weather, temperature, air pollution information, day of week, and point of interest (POI). In some embodiments, the travel origin or destination shows the origin or destination of a ride taken by a passenger or offered by a driver. The travel condition shows the traffic congestion situation, and sometimes people may not choose to take a ride when the traffic is congested. The weather (e.g., sunny, rainy, snowy, etc.) may also affect the travel demand. For example, people would like to join outdoor activities in sunny days, thus the travel demand in sunny days would increase compared to rainy or snowy days. Temperature may affect the travel demand. For example, people may rather be at home in low temperature environment in the winter. Further, air pollution information such as particulate matter information (e.g., PM 2.5, PM 10, etc.) or content of sulfur dioxide may be an important factor affecting the travel demand. For example, less travel demand may be generated under a heavy PM 2.5. Further, regarding day of week, traffic demand between residential districts and office buildings may be greater on weekdays than on weekends. Further, POI indicating how the land is used may also affect the travel demand. For example, residential POI generates travel demand in working day morning, and dining POI attracts travel demand in the evening.

The factors described herein are illustrative and are not exhaustive. Other factors affecting historical travel demands may be embraced in the scope of the present invention.

Figure 4:
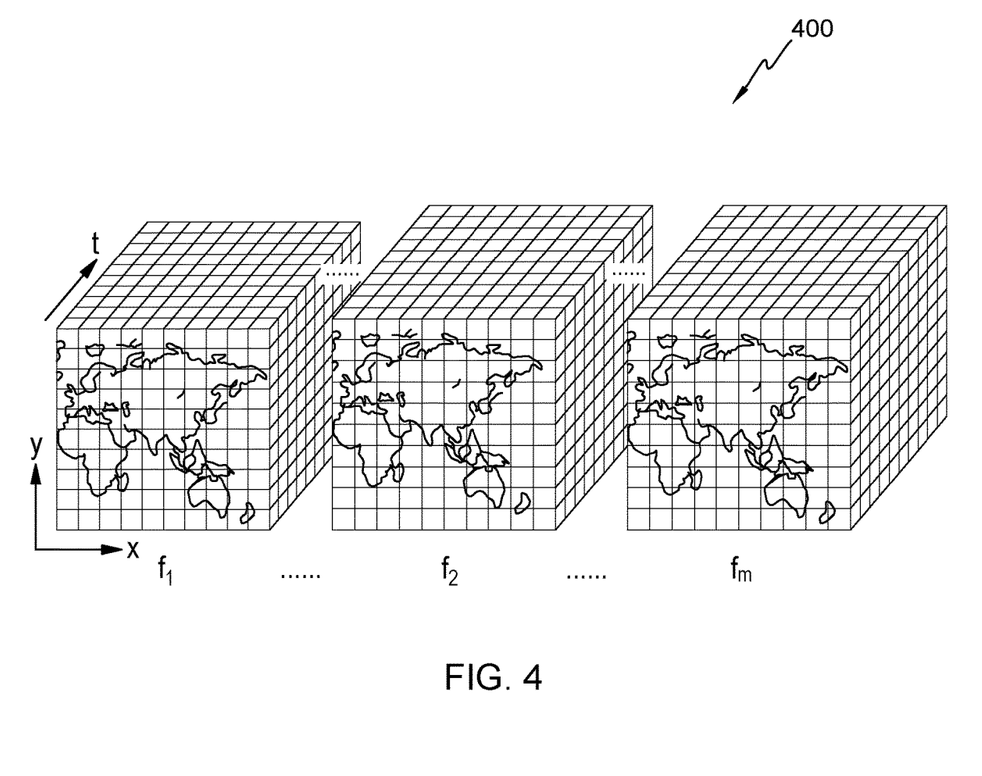
FIG. 4 shows an exemplary data structure of an observation sample according to an embodiment of the present invention.

FIG. 4 shows data structure 400, which is an exemplary data structure of an observation sample according to an embodiment of the present invention.

In some embodiments, data structure 400, corresponding to an observation sample, is a four-dimensional data structure. The first and second dimensions of the data structure are denoted by a map formed of two axes, x and y. The map is divided into a plurality of grids, wherein each grid specifies an observation position of a specific geographic district where an observation of a historical travel demand occurs. The third dimension is denoted by an axis t, and each segment on the axis t specifies an observation time period. The fourth dimension, denoted by each of the cubes formed of the three axes x, y, and t, specifies one of the factors $f_i \{f_1, \ldots, f_2, \ldots, f_m\}$, wherein i and m are natural numbers and $1 \leq i \leq m$) affecting historical travel demands.

In some embodiments, each observation sample is constructed with the same data structure. In other words, the observation time period, and the factors in each observation sample are identical. Further, the arrangement order of the factors in the data structure of one observation sample is the same as that of another observation sample. For example, factor $f_1$ in each observation sample may indicate weather, factor $f_2$ in each observation sample may indicate air pollution information, and factor $f_m$ in each observation sample may indicate POI (e.g., POI of hotels, POI of restaurants, etc.).

Although FIG. 4 shows a four-dimensional data structure of an observation sample, the data structure of the observation sample in the present invention is not thus limited to a data structure having four dimensions. Further, the arrangement order of the observation position, the observation time period, and the factors may be changed.

In some embodiments, existing clustering methods such as hierarchical clustering method and affinity propagation method are used for clustering the plurality of observation samples into one or more clusters.

In some embodiments, the plurality of observation samples are clustered based on similarity among the plurality of observation samples. In some embodiments, rules related to the similarity, i.e., equal rule, similar rule, adjacent rule, and ignore rule, are used to cluster the observation samples.

In some embodiments, the equal rule is used for clustering. That is, a first observation sample and a second observation sample may be clustered into one cluster in the case that a first factor in the first observation sample is equal to a factor corresponding to the first factor in the second observation sample. For example, observation sample $s_1$ and observation sample $s_2$ may be clustered into the same cluster $C_1$ in the case that factor $f_1$ (e.g., weather) in observation sample $s_1$ is equal to factor $f_1$ in observation sample $s_2$, since the same weather type may be likely to generate similar travel demands.

In some embodiments, the similar rule is used for clustering. That is, the first observation sample and the second observation sample may be clustered into one cluster in the case that the difference between a second factor in the first observation sample and a factor corresponding to the second factor in the second observation sample is below a predetermined threshold. For example, observation sample $s_1$ and observation sample $s_2$ may be clustered into the same cluster $C_1$ in the case that the difference between factor $f_2$ (e.g., air pollution information) in observation sample $s_1$ and factor $f_2$ in observation sample $s_2$ is below a predetermined threshold, since for example PM 2.5=100 or 110 make little difference to travel demands.

In some embodiments, the adjacent rule is used for clustering. That is, the first observation sample and the second observation sample may be clustered into one cluster in the case that the first observation sample and the second observation sample are adjacent in observation positions and/or observation time periods. For example, if the observation positions of the observation sample $s_1$ and observation sample $s_2$ are geographically adjacent to each other geographically, the observation samples $s_1$ and $s_2$ may be clustered into the same cluster $C_1$. Similarly, if the observation time periods of the observation sample $s_1$ and observation sample $s_2$ are adjacent to each other, then the observation samples $s_1$ and $s_2$ may be clustered into the same cluster $C_1$. This is because travel demands in adjacent positions and/or time periods usually would not change greatly.

In some embodiments, the ignore rule is used for clustering. That is, clustering the plurality of observation samples without considering a third factor in the case that the third factor brings an identical effect to the historical travel demands of the plurality of observation samples as another factor in the one or more factors. For example, if factor $f_3$ (e.g., POI of hotels) brings an identical effect to the historical travel demands as factor $f_4$ (e.g., POI of restaurants), then factor $f_3$ is not considered in clustering the observation samples, i.e., factor $f_3$ may be ignored.

The four exemplary rules for clustering described herein may be used independently or in combination for clustering the observation samples. Further, other rules related to similarity among the plurality of observation samples may be used for clustering.

Referring again to FIG. 3, in step S320, for each cluster, an actual probability distribution of the historical travel demands corresponding to the observation samples in the cluster is constructed.

Figure 5A:
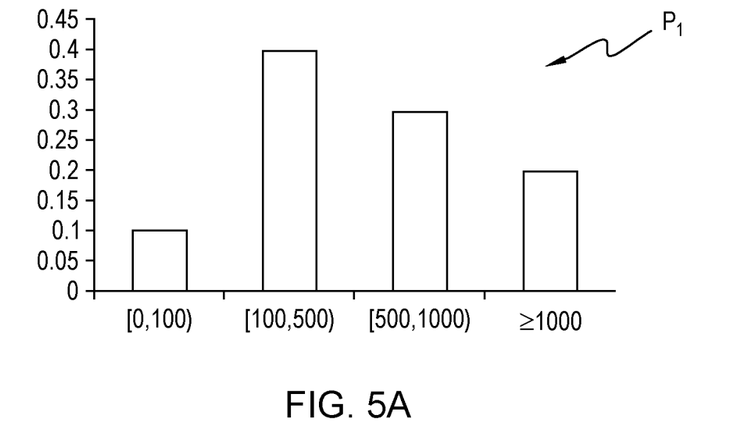
FIG. 5A shows an example of an actual probability distribution of historical travel demands according to an embodiment of the present invention.

FIG. 5A shows an example of actual probability distribution $P_1$ of the historical travel demands $N_1, N_2, \ldots, N_{10}$ in cluster $C_1$, previously discussed with reference to FIG. 2. Table 1 shows the exemplary values of the historical travel demands used for constructing the actual probability distribution $P_1$.

TABLE 1

| $N_1$ | $N_2$ | $N_3$ | $N_4$ | $N_5$ | $N_6$ | $N_7$ | $N_8$ | $N_9$ | $N_{10}$ |
|---|---|---|---|---|---|---|---|---|---|
| 90 | 300 | 400 | 600 | 1100 | 700 | 400 | 450 | 550 | 1100 |

In FIG. 5A, the horizontal axis denotes a distribution interval of the historical travel demands with a selected scale and the vertical axis denotes the probability corresponding to the interval. The scale (intervals) on the horizontal axis can be selected according to the need of the user. Specifically, in the example in FIG. 5A, with the the historical travel demands $N_1, N_2, \ldots, N_{10}$, the probability of historical travel demands in the interval of [0, 100) is 0.1, the probability of historical travel demands in the interval of [100, 500) is 0.4, the probability of historical travel demands in the interval of [500, 1000) is 0.3, and the probability of historical travel demands in the interval over 1000 is 0.2.

In some embodiments, the actual probability distribution $P_1$ of the historical travel demands is constructed using a non-parametric estimation method such as a kernel density estimation method. For example, a non-parametric estimation method may be used to construct the actual probability distribution $P_1$ from $N_1, N_2, \ldots, N_{10}$ in cluster $C_1$. By this means, a continuous probability distribution curve can be obtained.

In some embodiments, probability scale of the actual probability distribution is built based on business needs according to, for example, accuracy and granularity requirements. For example, the probability scale of the actual probability distribution as shown in FIG. 5A can be built as the intervals [0, 100), [100, 500), [500, 1000) and over 1000 based on business needs.

Referring again to FIG. 3, in step S330, for each cluster, observation samples in the cluster are inputted into a prediction model (e.g., prediction model 200) for predicting future travel demands to produce a result of prediction. The prediction model may be, for example, a Gaussian model, a Bayesian model, or other model for predicting future travel demands based on observation samples. In some embodiments, the prediction model includes a neuronal network.

Although FIG. 3 shows step S330 being performed after step S320, the order of step S320 and step S330 is thus not limited. For example, step S330 may be performed before step S320, or step S320 and step S330 may be performed in a parallel manner.

In step S340, for each cluster, a predicted probability distribution of the historical travel demands corresponding to the observation samples in the cluster is computed based on the result of prediction.

Figure 5B:
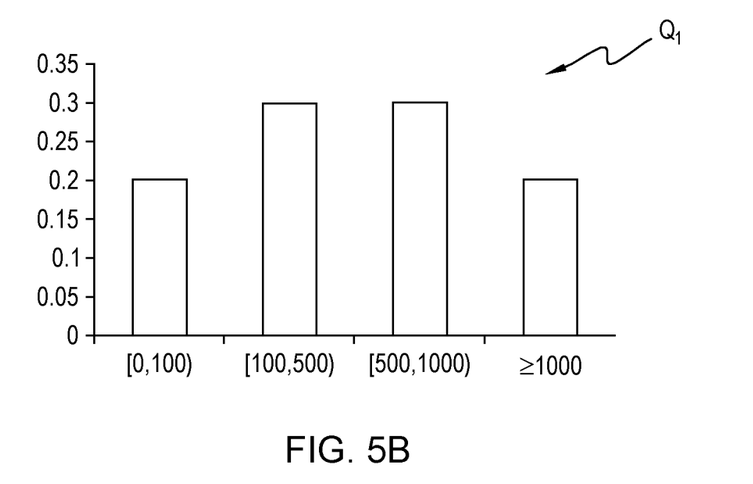
FIG. 5B shows an example of a predicted probability distribution according to an embodiment of the present invention.

FIG. 5B shows an example of predicted probability distribution $Q_1$ of the result of prediction $N_1', N_2', \ldots, N_{10}'$ based on cluster $C_1$, previously discussed with reference to FIG. 2. Table 2 shows the exemplary values of a result of prediction $N_1', N_2', \ldots, N_{10}'$ used for constructing the predicted probability distribution $Q_1$.

TABLE 2

| $N_1'$ | $N_2'$ | $N_3'$ | $N_4'$ | $N_5'$ | $N_6'$ | $N_7'$ | $N_8'$ | $N_9'$ | $N_{10}'$ |
|---|---|---|---|---|---|---|---|---|---|
| 70 | 90 | 400 | 700 | 800 | 1100 | 600 | 450 | 350 | 1200 |

In FIG. 5B, the horizontal axis denotes a distribution interval of the result of prediction and the vertical axis denotes the predicted probability corresponding to the interval. Specifically, with the result of prediction $N_1'$, $N_2'$, ..., $N_{10}'$, the predicted probability of result of prediction in the interval of [0, 100) is 0.2, the predicted probability of result of prediction in the interval of [100, 500) is 0.3, the predicted probability of result of prediction in the interval of [500, 1000) is 0.3 and the predicted probability of result of prediction in the interval over 1000 is 0.2.

In some embodiments, the predicted probability distribution is computed using a similar method as used for constructing the actual probability distribution, for example, a non-parametric estimation method such as a kernel density estimation method. Further, the probability scale of the predicted probability distribution may be the same as the actual probability distribution.

Referring again to FIG. 3, in step S350, for each cluster, a difference between the actual probability distribution and the predicted probability distribution of the cluster is evaluated.

In some embodiments, the difference between the actual probability distribution and the predicted probability distribution is evaluated using Kullback-Leibler (KL) divergence. The difference between the actual probability distribution P and the predicted probability distribution Q may be expressed by KL divergence as follows, $$D_{KL}(P||Q) = \sum_{i=1}^{K} P(i) \log \frac{P(i)}{Q(i)}$$

wherein K denotes the total number of observation samples in one cluster, P(i) denotes the probability of the historical travel demand corresponding to the ith observation sample, and Q(i) denotes the probability of the predicted travel demand corresponding to the ith observation sample.

In step S360, the prediction model is modified so that a statistical sum of the differences for the one or more clusters is decreased. In some embodiments, the prediction model is modified so that the statistical sum of the differences is minimized.

In some embodiments, as described above, the prediction model includes a neuronal network, and modifying the prediction model in the step S360 comprises a parameter modifying step. In the parameter modifying step, the differences for the one or more clusters may be used by the neuronal network for modifying parameters in the neuronal network. For example, the differences may be used to calculate a back propagation error as an input to an auto-encoder of the neuronal network to adaptively modify the decision logic of the neuronal network. In some embodiments, softmax is used for calculating the back propagation error.

Based on method 300 described above, a prediction model with uncertainty is acquired in a training phase and may be used in a prediction phase for predicting future travel demand efficiently. Specifically, in the prediction phase, testing samples with the same data structure as the observation samples are collected, then the testing samples are clustered and inputted to the prediction model. Finally, a result of prediction is outputted from the prediction model, thus future travel demand for each of the testing samples would be acquired.

Figure 6:
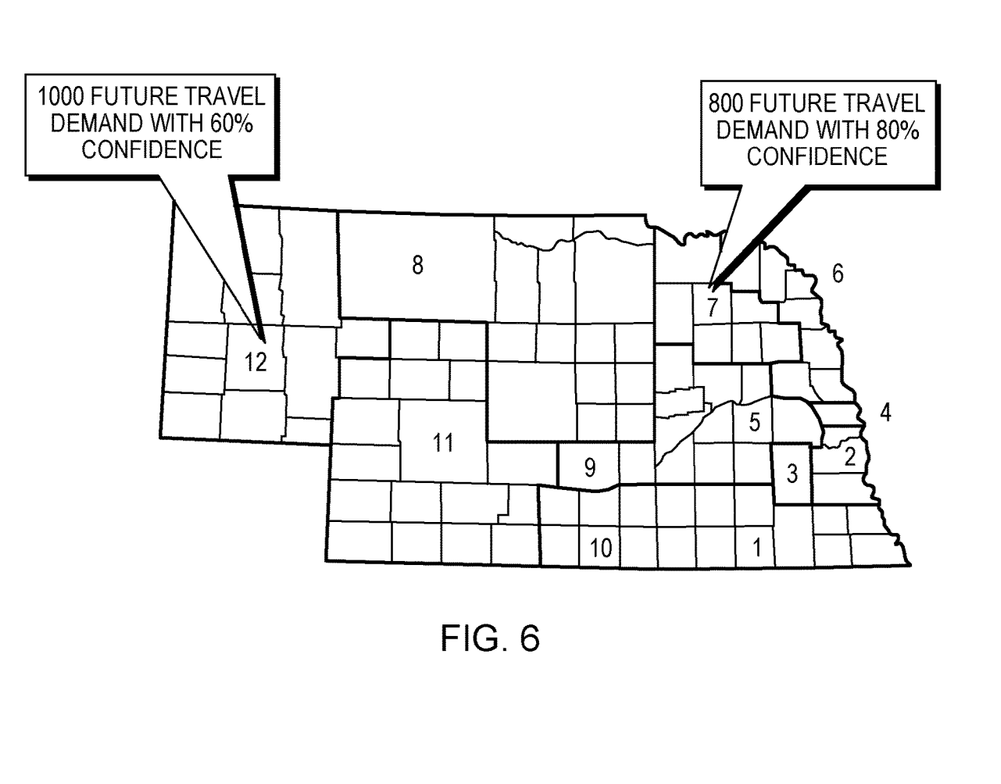
FIG. 6 shows an exemplary result of prediction acquired from a prediction model according to an embodiment of the present invention.

FIG. 6 shows an exemplary result of prediction acquired from a prediction model according to an embodiment of the present invention. For example, testing samples are inputted to the prediction model subject to training for acquiring the result of prediction for future travel demands in district 1 to district 12 in this afternoon. As shown in FIG. 6, the result of prediction shows that there is a future travel demand of 800 with 80% confidence in district 7 in this afternoon, and there is a future travel demand of 1000 with 60% confidence in district 12 in this afternoon. Thus, the user will be aware of the uncertainty with the prediction result. For example, a scheduling center for a ride-hailing service can better schedule the drivers to corresponding districts according to this information.

The present invention may be a system, a method, and/or a computer program product. The computer program product may include a computer readable storage medium (or media) having computer readable program instructions thereon for causing a processor to carry out aspects of the present invention.

According to at least one embodiment of the present invention, there is provided a system, which may comprise one or more processors and a memory coupled to at least one of the one or more processors. The system may further comprise a set of computer program instructions stored in the memory and executed by at least one of the one or more processors in order to perform an action of clustering a plurality of observation samples related to historical travel demands into one or more clusters. The system may further comprise a set of computer program instructions stored in the memory and executed by at least one of the one or more processors in order to perform an action of for each cluster, constructing an actual probability distribution of the historical travel demands corresponding to the observation samples in the cluster. The system may further comprise a set of computer program instructions stored in the memory and executed by at least one of the one or more processors in order to perform an action of for each cluster, inputting observation samples in the cluster into a prediction model for predicting future travel demands to produce a result of prediction. The system may further comprise a set of computer program instructions stored in the memory and executed by at least one of the one or more processors in order to perform an action of for each cluster, computing a predicted probability distribution of the historical travel demands corresponding to the observation samples in the cluster based on the result of prediction. The system may further comprise a set of computer program instructions stored in the memory and executed by at least one of the one or more processors in order to perform an action of for each cluster, evaluating a difference between the actual probability distribution and the predicted probability distribution of the cluster. The system may further comprise a set of computer program instructions stored in the memory and executed by at least one of the one or more processors in order to perform an action of modifying the prediction model so that a statistical sum of the differences for the one or more clusters is decreased.

According to at least one embodiment of the system, the plurality of observation samples may be clustered based on similarity among the plurality of observation samples.

According to at least one embodiment of the system, each of the plurality of observation sample may include an observation position and an observation time period for observation of a historical travel demand corresponding to the observation sample and one or more factors affecting the historical travel demand.

According to at least one embodiment of the system, clustering the plurality of observation samples into one or more clusters based on the similarity among the plurality of observation samples may include at least one of: clustering a first observation sample and a second observation sample into one cluster in the case that a first factor in the first observation sample is equal to a factor corresponding to the first factor in the second observation sample; clustering the first observation sample and the second observation sample into one cluster in the case that the difference between a second factor in the first observation sample and a factor corresponding to the second factor in the second observation sample is below a predetermined threshold; clustering the first observation sample and the second observation sample into one cluster in the case that the first observation sample and the second observation sample are adjacent in observation positions and/or observation time periods; and clustering the plurality of observation samples without considering a third factor in the case that the third factor brings an identical effect to the historical travel demands of the plurality of observation samples as another factor in the one or more factors.

According to at least one embodiment of the system, for each cluster, the actual probability distribution of the historical travel demands may be constructed using a non-parametric estimation method.

According to at least one embodiment of the system, the prediction model may include a neuronal network, and modifying the prediction model may comprise using the differences by the neuronal network for modifying parameters in the neuronal network.

According to at least one embodiment of the system, the one or more factors affecting the historical travel demand may include at least one of travel origin, travel destination, traffic condition, weather, temperature, air pollution information, day of week, and point of interest.

According to at least one embodiment of the present invention, there is provided a computer program product. The computer program product may comprise a computer readable storage medium having program instructions embodied therewith. The program instructions may be executable by a device to perform a method. The method may comprise clustering a plurality of observation samples related to historical travel demands into one or more clusters. The method may further comprise for each cluster, constructing an actual probability distribution of the historical travel demands corresponding to the observation samples in the cluster. The method may further comprise for each cluster, inputting observation samples in the cluster into a prediction model for predicting future travel demands to produce a result of prediction. The method may further comprise for each cluster, computing a predicted probability distribution of the historical travel demands corresponding to the observation samples in the cluster based on the result of prediction. The method may further comprise for each cluster, evaluating a difference between the actual probability distribution and the predicted probability distribution of the cluster. The method may further comprise modifying the prediction model so that a statistical sum of the differences for the one or more clusters is decreased.

According to at least one embodiment of the computer program product, the plurality of observation samples may be clustered based on similarity among the plurality of observation samples.

According to at least one embodiment of the computer program product, each of the plurality of observation samples may include an observation position and an observation time period for observation of a historical travel demand corresponding to the observation sample and one or more factors affecting the historical travel demand.

According to at least one embodiment of the computer program product, clustering the plurality of observation samples into one or more clusters based on the similarity among the plurality of observation samples may include at least one of: clustering a first observation sample and a second observation sample into one cluster in the case that a first factor in the first observation sample is equal to a factor corresponding to the first factor in the second observation sample; clustering the first observation sample and the second observation sample into one cluster in the case that the difference between a second factor in the first observation sample and a factor corresponding to the second factor in the second observation sample is below a predetermined threshold; clustering the first observation sample and the second observation sample into one cluster in the case that the first observation sample and the second observation sample are adjacent in observation positions and/or observation time periods; and clustering the plurality of observation samples without considering a third factor in the case that the third factor brings an identical effect to the historical travel demands of the plurality of observation samples as another factor in the one or more factors.

According to at least one embodiment of the computer program product, for each cluster, the actual probability distribution of the historical travel demands may be constructed using a non-parametric estimation method.

According to at least one embodiment of the computer program product, the prediction model may include a neuronal network, and modifying the prediction model may comprise using the differences by the neuronal network for modifying parameters in the neuronal network.

According to at least one embodiment of the computer program product, the one or more factors affecting the historical travel demand may include at least one of travel origin, travel destination, traffic condition, weather, temperature, air pollution information, day of week, and point of interest.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
generating one or more clusters of a plurality of observation samples related to actual historical travel demands;
for each cluster, constructing a distribution of the actual historical travel demands corresponding to the observation samples in the cluster;
for each cluster, generating a result of prediction by inputting observation samples of the cluster into a model, including dimensions of position, day of the week and time, and condition factors as parameters of the model;
for each cluster, generating a predicted distribution of travel demand based on the result of prediction from respective observation samples of the cluster input to the model;
for each cluster, determining a difference between the distribution of the actual historical travel demands and the predicted distribution of the cluster;

modifying parameters of the model corresponding to the dimensions of the position, the day of the week and the time, and the condition factors, so that a sum of the differences between the distribution of the actual historical travel demands and the predicted distribution of each of the one or more clusters is minimized;

in response to minimizing the sum of the differences between the distribution of the actual historical travel demands and the predicted distribution of each of the one or more clusters, creating a prediction model of travel demand, wherein the prediction model of travel demand includes a neural network, and modifying the parameters of the neural network of the prediction model is based on the differences between the actual historical travel demands and the predicted travel demands of the neural network; and generating a prediction of future traffic demand by inputting the dimensions of the position, the day of the week and time, and the condition factors to the predictive model.

2. The method according to claim 1, wherein the plurality of observation samples are clustered based on similarity among the plurality of observation samples.

3. The method according to claim 2, wherein each of the plurality of observation samples includes one or more condition factors selected from a group consisting of: travel origin, travel destination, traffic condition, weather, temperature, air pollution information, and point of interest in an area of travel, affecting the travel demand of the plurality of observation samples.

4. The method according to claim 3, wherein clustering the plurality of observation samples into one or more clusters based on the similarity among the plurality of observation samples includes:

clustering a first observation sample and a second observation sample into one cluster in response to determining the first observation sample is equal to a factor corresponding to the first factor in the second observation sample;

clustering the first observation sample and the second observation sample into one cluster in response to determining the difference between a second factor in the first observation sample and a factor corresponding to the second factor in the second observation sample is below a predetermined threshold;

clustering the first observation sample and the second observation sample into one cluster in response to determining the first observation sample and the second observation sample are adjacent in observation positions and/or observation time periods; and clustering the plurality of observation samples without considering a third factor in response to determining the third factor brings an identical effect to the historical travel demands of the plurality of observation samples as another factor in the one or more factors.

5. The method according to claim 1, wherein for each cluster, the distribution of the actual historical travel demands is constructed using a non-parametric estimation method.

6. The method according to claim 1, wherein the prediction model includes a neural network, and modifying the prediction model comprising:

using the differences between the actual historical travel demands and the predicted travel demands of the neural network for modifying parameters in the neural network.

7. A system comprising:
one or more processors;
a memory coupled to at least one of the one or more processors;
a set of computer program instructions stored in the memory and executed by at least one of the one or more processors in order to perform actions of:

generating one or more clusters of a plurality of observation samples related to actual historical travel demands;

for each cluster, constructing a distribution of the actual historical travel demands corresponding to the observation samples in the cluster;

for each cluster, generating a result of prediction by inputting observation samples of the cluster into a model, including dimensions of position, day of the week and time, and condition factors as parameters of the model;

for each cluster, generating a predicted distribution of travel demand based on the result of prediction from respective observation samples of the cluster input to the model;

for each cluster, determining a difference between the distribution of the actual historical travel demands and the predicted distribution of the cluster;

modifying parameters of the model corresponding to the dimensions of the position, the day of the week and the time, and the condition factors, so that a sum of the differences between the distribution of the actual historical travel demands and the predicted distribution of each of the one or more clusters is minimized;

in response to minimizing the sum of the differences between the distribution of the actual historical travel demands and the predicted distribution of each of the one or more clusters, creating a predictive model of travel demand, wherein the prediction model of travel demand includes a neural network, and modifying the parameters of the neural network of the prediction model is based on the differences between the actual historical travel demands and the predicted travel demands of the neural network; and generating a prediction of future traffic demand by inputting the factors of position, day of the week, time, and condition factors to the predictive model.

8. The system according to claim 7, wherein the plurality of observation samples are clustered based on similarity among the plurality of observation samples, and the distribution of the actual historical travel demands and the predicted actual historical travel demands are probability distributions.

9. The system according to claim 8, wherein each of the plurality of observation samples includes one or more condition factors selected from a group consisting of: travel origin, travel destination, traffic condition, weather, temperature, air pollution information, and point of interest in an area of travel, affecting the travel demand of the plurality of observation samples.

10. The system according to claim 9, wherein clustering the plurality of observation samples into one or more clusters based on the similarity among the plurality of observation samples includes at least one of:

clustering a first observation sample and a second observation sample into one cluster in response to determining a first factor in the first observation sample is equal to a factor corresponding to the first factor in the second observation sample;

clustering the first observation sample and the second observation sample into one cluster in response to determining the difference between a second factor in the first observation sample and a factor corresponding to the second factor in the second observation sample is below a predetermined threshold;

clustering the first observation sample and the second observation sample into one cluster in response to determining the first observation sample and the second observation sample are adjacent in observation positions and/or observation time periods; and clustering the plurality of observation samples without considering a third factor in response to determining the third factor brings an identical effect to the historical travel demands of the plurality of observation samples as another factor in the one or more factors.

11. The system according to claim 7, wherein for each cluster, the distribution of the actual historical travel demands is constructed using a non-parametric estimation method.

12. The system according to claim 7, wherein the prediction model includes a neural network, and modifying the prediction model comprises:
using the differences by the neural network for modifying parameters in the neural network.

13. A computer program product comprising a computer readable storage medium having program instructions embodied therewith, wherein the program instructions being executable by a device to perform a method comprising:
generating one or more clusters of a plurality of observation samples related to actual historical travel demands;

for each cluster, constructing a distribution of the actual historical travel demands corresponding to the observation samples in the cluster;

for each cluster, generating a result of prediction by inputting observation samples of the cluster into a model, including dimensions of position, day of the week and time, and condition factors as parameters of the model;

for each cluster, generating a predicted distribution of travel demand based on the result of prediction from respective observation samples of the cluster input to the model;

for each cluster, determining a difference between the distribution of the actual historical travel demands and the predicted distribution of the cluster;

modifying parameters of the model corresponding to the dimensions of the position, the day of the week and the time, and the condition factors, so that a sum of the differences between the distribution of the actual historical travel demands and the predicted distribution of each of the one or more clusters is minimized;

in response to minimizing the sum of the differences between the distribution of the actual historical travel demands and the predicted distribution of each of the one or more clusters, creating a prediction model of travel demand, wherein the prediction model of travel demand includes a neural network, and modifying the parameters of the neural network of the prediction model is based on the differences between the actual historical travel demands and the predicted travel demands of the neural network; and generating a prediction of future traffic demand by inputting the dimensions of the position, the day of the week and time, and the condition factors to the predictive model.

14. The computer program product according to claim 13, wherein the plurality of observation samples are clustered based on similarity among the plurality of observation samples, and the distribution of the actual historical travel demands and the predicted actual historical travel demands are probability distributions.

15. The computer program product according to claim 14, wherein each of the plurality of observation samples includes one or more condition factors selected from a group consisting of: travel origin, travel destination, traffic condition, weather, temperature, air pollution information, and point of interest in an area of travel, affecting the travel demand of the plurality of observation samples.

16. The computer program product according to claim 15, wherein clustering the plurality of observation samples into one or more clusters based on the similarity among the plurality of observation samples includes at least one of:
clustering a first observation sample and a second observation sample into one cluster in response to determining a first factor in the first observation sample is equal to a factor corresponding to the first factor in the second observation sample;

clustering the first observation sample and the second observation sample into one cluster in response to determining the difference between a second factor in the first observation sample and a factor corresponding to the second factor in the second observation sample is below a predetermined threshold;

clustering the first observation sample and the second observation sample into one cluster in response to determining the first observation sample and the second observation sample are adjacent in observation positions and/or observation time periods; and clustering the plurality of observation samples without considering a third factor in response to determining the third factor brings an identical effect to the historical travel demands of the plurality of observation samples as another factor in the one or more factors.

17. The computer program product according to claim 13, wherein the prediction model includes a neural network, and modifying the prediction model comprises:
using the differences by the neural network for modifying parameters in the neural network.

* * * * *